April 1, 1958     A. C. HOWARD     2,828,677
ROAD MAKING MACHINES

Filed April 29, 1954     5 Sheets-Sheet 1

INVENTOR
A. C. HOWARD
ATTYS.

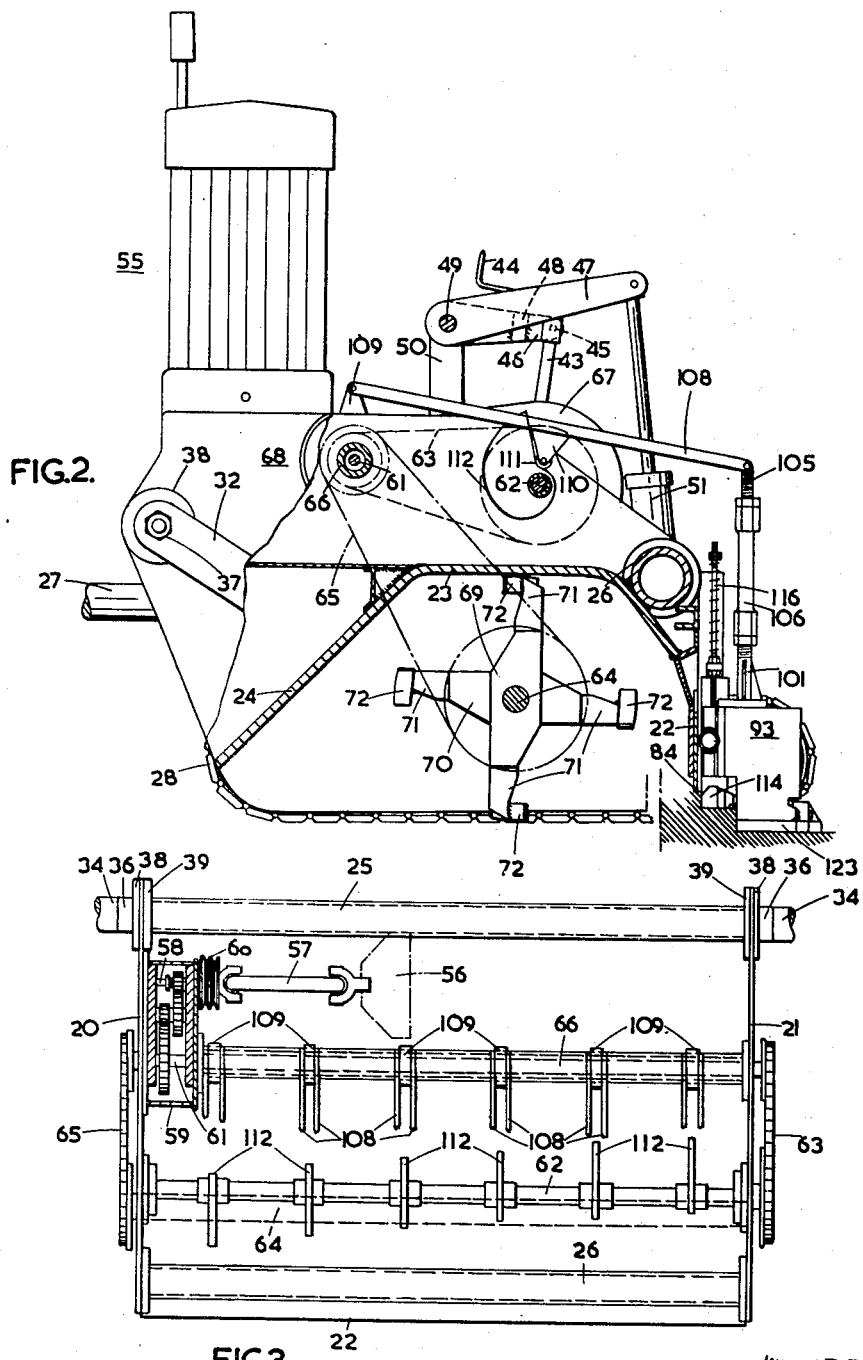

April 1, 1958  A. C. HOWARD  2,828,677
ROAD MAKING MACHINES
Filed April 29, 1954  5 Sheets-Sheet 3

INVENTOR
A. C. HOWARD
By Mawhinney + Mawhinney
ATTYS.

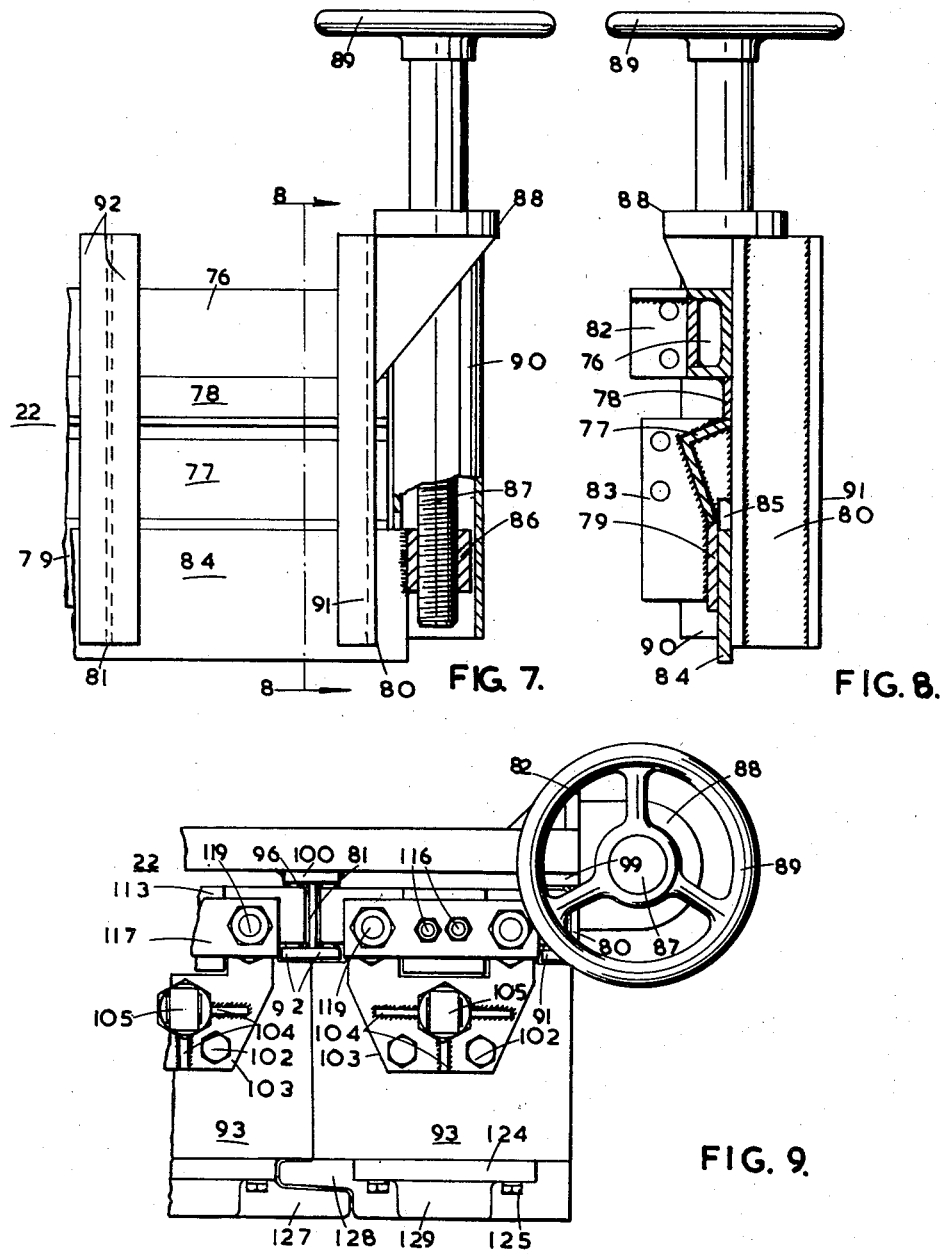

INVENTOR
A C. HOWARD

United States Patent Office 2,828,677
Patented Apr. 1, 1958

2,828,677

ROAD MAKING MACHINES

Arthur Clifford Howard, East Horndon, England, assignor to Rotary Hoes Limited, East Horndon, Essex, England Application April 29, 1954, Serial No. 426,341

Claims priority, application Great Britain May 2, 1953

14 Claims. (Cl. 94—49)

The object of the invention is a machine to be progressed in one direction over the ground for compacting a top layer thereon of loose material (e. g., earth, with or without additives such as pitch, or cement powder and water), to provide a load-carrying surface such as a road or a foundation therefor.

The machine of the invention includes a power-driven rotor supported, with its axis transverse to the direction of progression, from a frame which provides a compartment, with an open bottom, extending upwardly from the ground level, for the loose material in which latter the rotor is at least to be substantially buried, the rotor having tools acting on the loose material for reversely moving it generally laterally of the machine for intermixing purposes and for throwing it rearwardly beneath a rigidly-supported strike-off arranged transversely at the rear of the frame, and there being, in rear of the strike-off and parallel thereto, a transverse, closely-spaced series of vertically-guided hammers which are operated from a power-driven cam shaft for tamping that of the loose material which passes rearwardly under the strike-off.

The hammers can be pivotally supported from trailing ends of levers which are fulcrumed at their forward ends from the frame on a transverse axis and which, at corresponding intermediate positions, have followers, such as rollers, coacting with respective snail-type cams of the cam shaft, the latter supported from the frame with its axis transverse to the direction of progression. Resilient buffers, fast with the frame, can be provided for limiting the extent of the downward movement of the hammers.

Preferably the connections between the hammer-supporting levers and the hammers provide for vertical adjustment of the latter so that the height of their strokes, relatively to the rotor axis, can be varied.

According to yet another feature, the hammers have the planes of their feet horizontal and there is, in front of their leading sides, a means for preliminarily compacting the loose material.

These preliminary compacting means can include subsidiary hammers which are respectively supported from the main ones, the subsidiary hammers being biassed upwardly for their feet normally to be at a higher level than the feet of the main hammers, whereby the inertia of the subsidiary hammers causes them, when the associated main hammers complete the tamping strokes, to move against their biasses for effecting the preliminary compacting.

Preferably the subsidiary hammers have the planes of their feet substantially horizontal, and each of them can be generally of inverted T-shape with the central stem extending through a hole of a bridge-like part fast with the associated main hammer, the bias being applied by a coiled compression spring reacting between an abutment at the top of the stem and the said bridge-like part.

According to a further feature each of the main hammers is shod with a detachable sole plate which can be renewed as necessary. This sole plate can be of more durable material than the main body of the main hammer, and it can be chromium-plated or otherwise treated on its underside for reducing any tendency for the material being tamped to adhere to it.

According to another feature the feet of the main hammers, or the sole plates when they are used, are provided at their lateral sides towards the rear with lateral extensions which are guided in coacting recesses in the adjacent lateral side of an adjacent main hammer, whereby to avoid the formation on the tamped surface of ridges corresponding with the working clearance between the said adjacent hammers. Thus, the adjacent lateral sides of the sole plates of two adjacent main hammers can each have one of the recesses and one of the extensions for interengagement with the complementary extension and recess on the other, and in this way the lateral extensions, as the machine progresses, not only flatten the aforesaid ridges but also any laterally directed ridges formed by the leading edge of the extensions themselves.

The strike-off can be a vertically-adjustable horizontal plate extending transversely across the back of the aforesaid frame, and by adjusting the height of the bottom edge of the strike-off the height, above ground level, of the loose material passing under it for compacting by the hammers can be regulated. Preferably the strike-off is supported for its opposite ends to be separately adjustable, whereby it can be tilted longitudinally, and the bottom edge of the strike-off can be straight or curved to a desired section of road camber—in which event the feet of the hammers would conform to the same camber.

According to a still further feature the machine is supported, at each side and in a manner to be adjustable for height, from endless tracks or wheels which can be power-driven, and the aforesaid frame can support a power plant from which the tracks (or wheels, as appropriate), the rotor and the cam shaft can be driven through gearing at appropriate relative speeds.

In the accompanying drawings, which show one form of machine according to the invention:

Figures 1 and 2 are similar side elevations, Figure 2 being partly broken away to disclose interior structure;

Figure 3 is a plan view, to a smaller scale, of the compartment and drive transmissions for the cam shaft and earth-working rotor;

Figure 7 is an elevation, to an enlarged scale, of the right-hand end of the rear wall of the compartment and showing means for adjusting the height of the strike-off;

Figure 8 is a section on the line 8—8 of Figure 7;

Figure 9 is a plan view corresponding with Figure 7;

Figure 1:
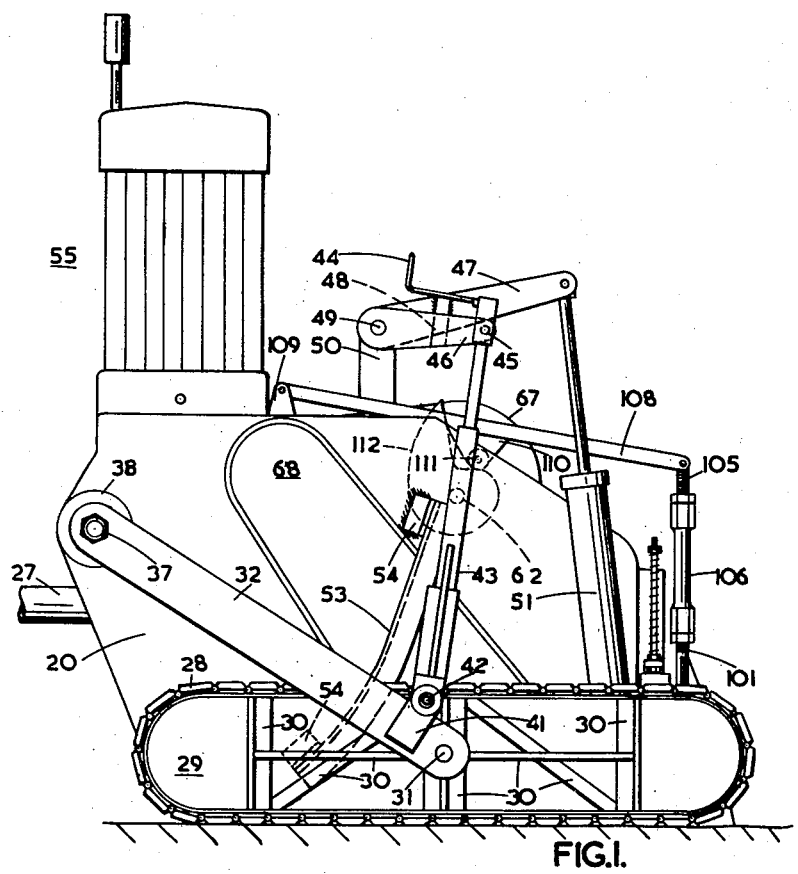

Referring to Figures 1 to 4, the machine includes a compartment with an open bottom and comprising side walls 20, 21 and a rear wall 22 while interiorly it has a transverse partition defining a roof portion 23 and a forwardly-declining wall 24. The side walls are stayed at the front and rear by transverse members 25 and 26, and elsewhere by other members as will hereinafter be mentioned.

At the front of the machine is shown a two-bar 27 extending from a machine (not shown) for loosening the earth and for incorporating cement powder and water with it, and the wall 24 of the compartment terminates sufficiently above ground level, as shown in Figure 2, for allowing ingress of the mixture as the machine of the invention is progressed over the ground.

The machine is supported at each side by an endless track 28, 28 which can run freely about the periphery of a supporting frame 29, the latter being re-inforced by a frame-work 30 having a central pivotal support 31 from the trailing end of a rearwardly-declining arm 32 which is pivoted from the front transverse member 25.

Figure 4:
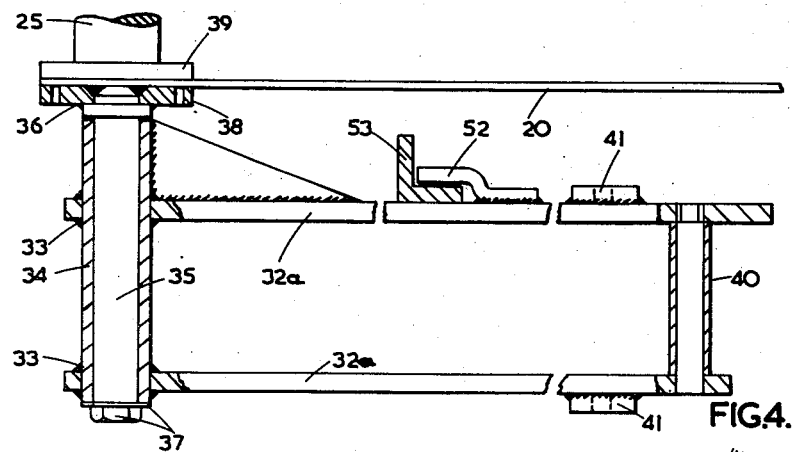
Figure 4 is a plan view, to a larger scale, of a supporting arm for one of the endless tracks.

As shown by Figure 4, each of the arms 32 comprises a pair of parallel plates 32a, 32a interconnected, as by welding 33, with a tube 34 which is endwise located on a pivot pin 35 between a shoulder 36 and a nut and washer 37. The shoulder, and an extending end of the pivot pin are welded to a flange 38 by which they are attached to the adjacent side wall 20, or 21, in alignment with an end flange 39 of the member 25. At their rear ends the plates 32a, 32a are interconnected by a tube 40 forming part of the pivotal support 31, the track 28 (not shown in Figure 4) being arranged between the two said plates.

Each of the latter has a cheek 41 fast with it, and the pair of cheeks provide a pivotal support 42 for the foot of a screw-operated, telescopic strut 43 of which the head, provided with a crank-handle 44, has a trunnion interconnection 45 with the outer end of an arm 46. This arm, and an arm 47 rigidly connected to it by a web 48 are journalled at 49 at the head of a stanchion 50 which is fast with a rigid part (not shown) of the machine, and between the outer end of the arm 47 and a part (not shown) of the machine frame are pivoted the outer ends of a hydraulic piston and cylinder arrangement 51.

Extension of the latter depresses the associated track to raise that side of the machine, and any fine height adjustment can be effected by turning the crank-handle 44 of the strut 43. As each track is similarly supported the machine can be lifted bodily or trimmed laterally. The inner plate 32a of each arm 32 is provided with a rigid finger 52 (see Figure 4) to engage behind a flange of an angle member 53 which is supported by brackets 54, 54 from the adjacent side wall 20 or 21 for guiding the associated track during a height adjustment. The lower portion of the member 53 is arcuate about the pivot of the arm 32 and its upper portion is straight so as to extend over the chain case 68 to the upper bracket 54.

The machine carries an internal combustion engine indicated generally at 55, and this (see Figure 3) drives, through a first gear box 56, a universally-jointed shaft 57. The latter drives the input shaft 58 of a second gear box 59 mounted from the side wall 20, and is shown with an exterior pulley 60 from which a belt drive to an auxiliary can be taken.

The gear box 59 has an output shaft 61 which is driven from the shaft 58 by a reduction gear train as shown and at one end extends through a transverse tubular member 66 serving additionally to stay the side walls 20 and 21. At its end remote from the gear box 59 the shaft 61 drives a cam-shaft 62 (hereinafter described) through a sprocket and chain drive 63, while at the opposite end it drives a rotor shaft 64 (hereinafter described) through a second sprocket and chain drive 65. The chain and sprocket drives 63 and 65 are enclosed in casings 67 and 68 respectively made fast with the side walls 21 and 20. By driving the cam shaft and rotor from opposite ends their axes can be arranged close to each other.

Figure 5:
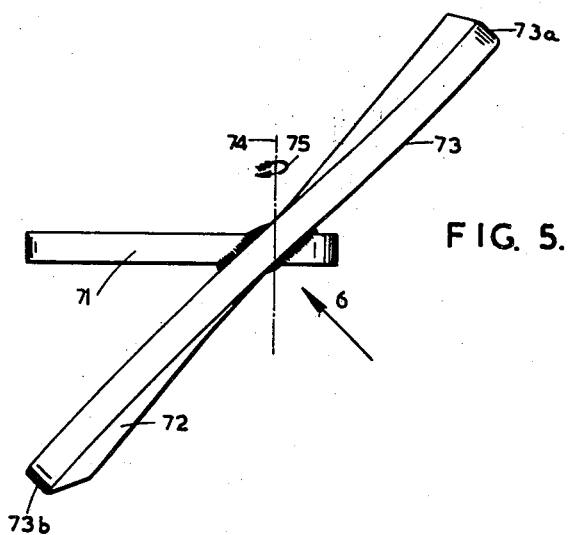
Figure 5 is a plan view of one of the earth-working blades of the rotor.
Figure 6:
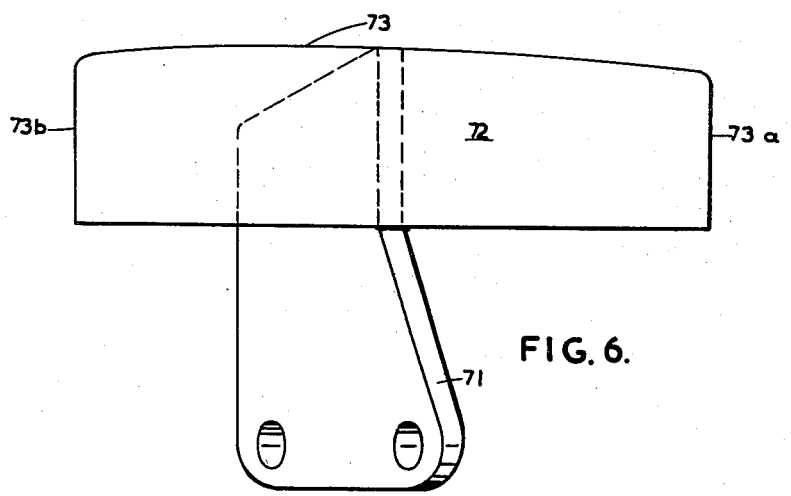
Figure 6 is a view of the blade in the direction of the arrow 6 of Figure 5.

The rotor shaft 64 has axially-spaced, angularly-staggered diametrical arms 69, 70 (only two of which are shown in Figure 2) having earth-working tools at their outer ends. These tools can be of flat plate and be substantially T-shaped, in edge view, with the central limb 71 with its major width in a radial plane, and with the lateral limb 72 trailing somewhat helically about the rotor axis as shown in Figures 5 and 6. The tools of adjacent diametrical arms have their lateral limbs overlapping circumferentially of the rotor and their helices oppositely directed so that the mixture of earth, cement powder and water in which they work is not only thrown back and forth between adjacent sets of tools but is flung rearwardly towards a strike-off presently to be described. Preferably the lateral limbs, which have leading cutting edges 73, are given a slight negative rake so that they also consolidate the material in which they are working and throw any surplus to in front of the rotor to be re-worked subsequently, and these cutting edges are curved from the end 73a which leads about the axis of rotation (indicated by the chain line 74 of Figure 5, rotation in that figure being in the direction indicated by the arrow 75) to the trailing end 73b so as to ensure continuous contact of the cutting edge with the earth while the machine advances.

The rear wall 22 of the compartment (see, particularly, Figures 7 to 9) consists of a transverse box-like member 76, and angle member 77 and two flat strips 78 and 79, these being interconnected at their adjacent edges by welding and tied together on the outside by a series of vertical guides 80, 81 which will presently be described. At each end the wall 22 is provided with brackets 82, 83 by which it can be bolted to the side walls 20 and 21.

A strike-off 84 is guided in a space between the adjacent surfaces of the strip 79 and the guides 80, 81 and its ends extend outwardly through slots 85 in the brackets 83 where they are provided with integral bosses 86 with screw-threaded bores. Each of these latter is engaged by a screw 87 which is axially located in a part 88, fast with the surrounding structure, and provided with a handwheel 89. The screw is enclosed in a tube 90, also fast with the structure, and by turning both hand-wheels the height of the bottom edge of the strike-off can be adjusted; it can also be desirably tilted by operating the two screws 87 differentially.

The guides 80 are of rectilinear C-shaped cross-section and are at the ends of the rear wall 22, having single flanges 91 directed towards each other, and the guides 81 are equally spaced between them and are of I-section for each to provide a pair of oppositely-directed flanges 92 which are co-planar with the flanges 91. The flanges 91 and 92 guide the hammers.

The hammers 93 are rectangular in plan and have vertical grooves 94 in their lateral walls to receive the flanges 91 and 92. Also, each of the lateral walls, intermediate the grooves and their front edges, is recessed to provide a housing for a roller 96 which is journalled on a stub shaft 97 made fast in a bore of the hammer by a pair of set-screws 98. These rollers run on the outer faces of the other flanges 99, 100 of the guides 80 and 81, respectively, by which the latter are secured to the rear wall 22.

Figures 10, 11:
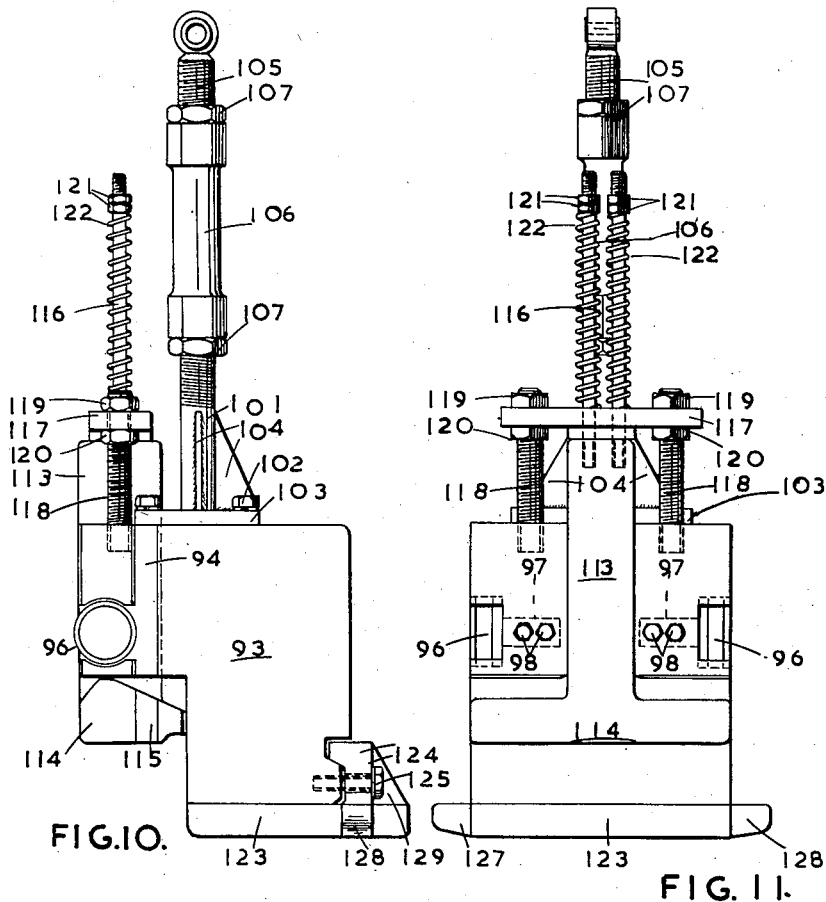
Figure 10 is a side view, to an enlarged scale, of a main, and a subsidiary, hammer for effecting the tamping.
Figure 11 is a rear view corresponding with Figure 10.

Each of the hammers 93 has a stanchion 101 made fast with its top as shown in Figures 10 and 11, the stanchion being secured in position by screws 102 extending through a flange 103 into the hammer, and the stanchions are stayed to the flanges by gussets 104. Each of the stanchions is connected with a screw-threaded eye-piece 105 by an internally screw-threaded sleeve 106, the threads of the stanchion and eye-piece being of opposite hands, to form a strut of which the length can be adjusted and locked by nuts 107 bearing on the ends of the sleeve.

The eye-pieces 105 of the hammers are pivoted at the rear of respective operating levers 108 (see Figures 1 and 2) which are pivotally supported at the front in brackets 109 fast with the transverse member 66 and each of which carries, in an intermediate position, a bracket 110 in which is journalled a roller 111. These rollers are acted on, as followers, by respective snail cams 112 which are arranged in appropriately axially and angularly spaced relationship on the cam shaft 62 for raising the hammers and dropping them sequentially. For convenience, and as shown in Figure 3, each of the operating levers 108 can be formed double.

At the front of each hammer 93 is a subsidiary hammer which is substantially of inverted T-shape and guided by its central limb 113, in a central slot of the hammer 93. The head 114 of the subsidiary hammer has vertical grooves 115 to receive the flanges 91 (or 92, as appropriate) of the guides 80 and 81 and, fast at the top of the limb 113 is a pair of stems 116 which extend guidedly through holes of a bridge-piece 117. The latter is supported from the hammer 93 by screw-threaded posts 118, 118 and locked in position by nuts 119, 120.

Each of the stems 116 has a pair of lock-nuts 121 on a screw-threaded portion at the top, and a compression spring 122 reacts between these nuts and the bridge-piece to bias the subsidiary hammer upwardly for its bottom face normally to be at a level above the bottom of a renewable sole-plate 123 secured to the foot of the coacting hammer 93.

The sole plates are of more durable material than that of the hammers 93 and can be chromium-plated or otherwise treated on the underside for reducing any tendency for the material being tamped to adhere to it.

The sole-plate has an upstanding flange 124 across its rear for bolting at 125 to the back of the hammer 93, and this flange has a forwardly-directed lip 126 having a horizontal top surface and a forwardly-inclining under surface for engaging in a corresponding groove across the back of the hammer, thus enabling the sole-plate to be held firmly in position in flat abutting contact with the bottom face of the hammer.

Figure 12:
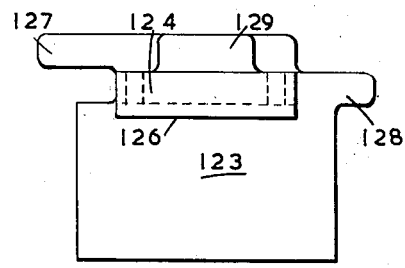
Figure 12 is a plan of a sole-plate for a hammer.

The sole plates (see Figures 9 and 12) have staggered lateral extensions 127, 128 to overlap the corresponding lateral extensions of the adjacent sole plates, and in this manner any ridges formed, between the adjacent hammers, in the material being tamped are flattened out. A stout gusset 129 interconnects the base of each sole plate with its upstanding flange 124.

In operation the machine is towed along the ground to be worked on at an appropriate rate (e. g., six feet per minute) for the previously formed mixture of earth, cement powder and water to enter the compartment under the bottom lip of the front wall 24. The rotor then thoroughly intermixes the material and feeds it under the strike-off 84 (which latter will have been adjusted to an appropriate height) to be tamped by the hammers. As each of the hammers 93 delivers its tamping blow, the inertia of its associated subsidiary hammer 114 causes the latter to continue to move against the effort of the biassing springs 122 for delivering a lighter blow for effecting a preliminary tamping of the material, the rotor continuing to deliver the material into the depressions formed during the preliminary tamping. By choosing an appropriate ratio for the drive to the cam shaft 62 it can be arranged for each of the hammers 93 to deliver more than one blow while the machine progresses a distance equal to the fore-and-aft dimension of the hammers.

What I claim as my invention and desire to secure by Letters Patent of the United States is:

1. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, and power-operated means for driving said rotor and cam-shaft.

2. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers in rear of said strike-off, a guide means fast at the outside of a rear wall of said compartment and coacting with said hammers to guide the latter for vertical movement, a series of parallel levers directed longitudinally of said compartment, pivotal connections from said compartment on a transverse axis for the front ends of said levers, respective pivotal connections between the rear ends of said levers and said hammers, respective cam followers on said levers intermediate their ends, a cam-shaft arranged transversely of said compartment and journalled from lateral walls thereof, respective cams on said cam-shaft for coaction with said cam followers, said cams and cam followers acting on said levers for raising said hammers and releasing them to fall by gravity for tamping the loose material beneath them, said hammers when in lowered position acting as abutments for the material delivered by said rotor through said outlet, and power-operated means for driving said rotor and cam-shaft.

3. A machine according to claim 2 in which the cams are of the snail-type and are relatively angularly spaced on the cam-shaft whereby the hammers will be operated sequentially as the cam-shaft rotates.

4. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers in rear of said strike-off, vertical guide means fast at the outside of a rear wall of said compartment, said guide means providing laterally-directed flanges engaging in vertical grooves in the lateral walls of said hammers to guide the latter for vertical movement, the lateral walls of said hammers intermediate said grooves and front faces of said hammers formed with recesses, a roller within each said recess and journalled from the associated hammer, said rollers coacting anti-frictionwise with said laterally-directed flanges during vertical movement of said hammers, a series of parallel levers directed longitudinally of said compartment, pivotal connections from said compartment on a transverse axis for the front ends of said levers, respective pivotal connections between the rear ends of said levers and said hammers, respective cam followers on said levers intermediate their ends, a cam-shaft arranged transversely of said compartment and journalled from lateral walls thereof, respective cams on said cam-shaft for coaction with said cam followers, said cams and cam followers acting on said levers for raising said hammers and releasing them to fall by gravity for tamping the loose material beneath them, said hammers when in lowered position acting as abutments for the material delivered by said rotor through said outlet, and power-operated means for driving said rotor and cam-shaft.

5. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, means intermediate said strike-off and hammers acting on said loose material for preliminarily compacting it before it is operated upon by said hammers, a cam-shaft operated means for raising said hammers and releasing them to fall by gravity for tamping the loose material beneath them, said hammers when in lowered position acting as abutments for the material delivered by said rotor through said outlet, and power-operated means for driving said rotor and cam-shaft.

6. A machine according to claim 5 in which the means for preliminarily compacting the loose material comprises subsidiary hammers respectively supported from the hammers, vertical guide means between each subsidiary hammer and its associated said hammer, and means biassing each subsidiary hammer upwardly with respect to its associated said hammer for the foot of the subsidiary hammer to be normally at a higher level than the foot of the said hammer, each said subsidiary hammer descending by inertia against its biassing means when the descent of the associated said hammer is arrested at the end of a tamping stroke whereby the subsidiary hammer delivers a lighter blow to partially compact the loose material in advance of the said hammer.

7. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of main hammers, vertical guide means fast with the rear of the compartment for the said hammers, said guide means supporting said hammers in rear of said strike-off, each main hammer having a vertical groove in its front face, for each main hammer a subsidiary hammer generally of inverted T-shape, a bridge member across the top of the vertical groove of each main hammer, the central stem of the T of each subsidiary hammer guided in said groove and extending through a hole of said bridge member, an abutment at the top of the extending end of said central stem, a compression spring reacting between said abutment and said bridge member to bias said subsidiary hammer upwardly for its foot normally to be at a higher level than the foot of the associated main hammer, each said subsidiary hammer descending by inertia against its biassing means when the descent of the associated main hammer is arrested at the end of a tamping stroke whereby the subsidiary hammer delivers a lighter blow to partially compact the loose material in advance of the main hammer, a cam-shaft operated means for raising said main and subsidiary hammers and releasing them to fall by gravity for tamping the loose material beneath them, said hammers when in lowered position acting as abutments for the material delivered by said rotor through said outlet, and power-operated means for driving said rotor and cam-shaft.

8. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, a respective renewable sole plate detachably fast with each said hammer, said sole plates having staggered lateral extensions arranged to lie alongside like extensions of the sole plates of adjacent hammers whereby to flatten any ridges formed in the tamped material due to clearance between adjacent hammers, and power-operated means for driving said rotor and cam-shaft.

9. A machine to be progressed in one direction over the ground for compacting a top layer of loose material thereon, comprising a compartment with an open bottom and substantially upright walls and a mouth at the bottom of the front to admit the loose material during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, ground-engaging means supported from each lateral side of the compartment and adapted to engage the ground at the sides of the layer so that the latter is admitted through the mouth, means for vertically adjusting each said ground-engaging means for sustaining the compartment for each lateral side thereof to be at an appropriate height relatively to the ground, and power-operated means for driving said rotor and cam-shaft.

10. A machine to be progressed in one direction over the ground for compacting a top layer of loose material thereon, comprising a compartment with an open bottom and substantially upright walls and a mouth at the bottom of the front to admit the loose material during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, an endless track mechanism at each lateral side of the compartment, respective trailing arms pivotally connected at their rear ends to said track mechanism centrally of the latter, the front ends of said trailing arms pivotally supported from the compartment, respective controllably extensible means substantially vertically interconnecting said track mechanisms with said compartment whereby the height of each track mechanism relatively to the compartment can be adjusted, and power-operated means for driving said rotor and cam-shaft.

11. A machine according to claim 10 in which each controllably extensible means comprises a pair of relatively fast arms pivoted from the compartment in a position spaced above the pivotal interconnection of the trailing arms and track mechanism, a hydraulic piston and cylinder arrangement connected to react between a stationary part of the compartment and one of said relatively fast arms and a screw-operated extensible strut interconnecting the other of said arms and said track mechanism, said hydraulic arrangement providing for a coarse adjustment of the height of said track mechanism and said strut providing for a fine adjustment thereof.

12. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor within and supported from said compartment, said rotor including an axially spaced arrangement of tools fast with a shaft and adapted to work the loose material and deliver it rearwardly towards the strike-off plate, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, an internal combustion engine, a driven shaft extending transversely of the compartment, reduction gearing interconnecting said engine and said driven shaft, and respective chain and sprocket drives from opposite ends of said driven shaft to said rotor and cam-shaft.

13. A machine to be progressed in one direction over the ground for compacting a top layer of loose material thereon, comprising a compartment with an open bottom and substantially upright walls and a mouth at the bottom of the front, ground-engaging means supported from each lateral side of the compartment and adapted to engage the ground at the sides of the layer so that the latter is admitted through the mouth during progression of the machine, a strike-off arranged transversely at the rear of the compartment and defining the upper margin of an outlet therefrom for the loose material, said strike-off supported from the rear of the compartment, a transverse power-driven rotor shaft within said compartment, axially-spaced radial arrangements of tools fast with said rotor shaft, each tool having an operative face which is helically inclined, the tools in adjacent radial arrangements having their helically inclined faces of opposite senses whereby to translate the loose material back and forth laterally as well as forwardly through said outlet, a transverse closely-spaced series of hammers, vertical guide means fast with the rear of the compartment for the said hammers, said guide means supporting said hammers in rear of said strike-off, a cam-shaft operated means for raising said hammers and releasing them to fall by gravity for tamping the loose material beneath them, said hammers when in lowered position acting as abutments for the material delivered by said rotor through said outlet, and power-operated means for driving said rotor and cam-shaft.

14. A machine according to claim 13 in which the radially outer edge of the helically inclined face of each tool is curved to be of less radial extent at its leading end than at its trailing end.

References Cited in the file of this patent

UNITED STATES PATENTS

| Number | Name | Date |
|---|---|---|
| 1,953,825 | Finley | Apr. 3, 1934 |
| 2,116,816 | Winkler | May 10, 1938 |
| 2,168,507 | Barber | Aug. 8, 1939 |
| 2,211,933 | Madsen | Aug. 20, 1940 |
| 2,393,954 | Baker | Feb. 5, 1946 |
| 2,394,017 | Seaman | Feb. 5, 1946 |
| 2,413,632 | Jackson | Dec. 31, 1946 |
| 2,424,459 | Hettelsater | July 22, 1947 |
| 2,669,915 | McConnaughay | Feb. 23, 1954 |